(12) United States Patent
Sakai et al.

(10) Patent No.: US 8,907,215 B2
(45) Date of Patent: Dec. 9, 2014

(54) CORRUGATED TUBE PROTECTOR

(75) Inventors: Suguru Sakai, Makinohara (JP);
Yoshihito Imaizumi, Makinohara (JP);
Hiroaki Takahashi, Makinohara (JP);
Ryouta Ando, Makinohara (JP)

(73) Assignee: Yazaki Corporation, Tokyo (JP)

( * ) Notice: Subject to any disclaimer, the term of this patent is extended or adjusted under 35 U.S.C. 154(b) by 261 days.

(21) Appl. No.: 13/468,250

(22) Filed: May 10, 2012

(65) Prior Publication Data

US 2012/0285728 A1 Nov. 15, 2012

(30) Foreign Application Priority Data

May 13, 2011 (JP) ................................ 2011-107829

(51) Int. Cl.
*H02G 3/16* (2006.01)
*H02G 3/14* (2006.01)
*H02G 3/08* (2006.01)
*H02G 3/06* (2006.01)

(52) U.S. Cl.
CPC .................................. *H02G 3/0691* (2013.01)
USPC .............. 174/61; 174/50; 174/72 A; 174/489;
174/520; 361/600; 439/76.1; 439/76.2

(58) Field of Classification Search
CPC ... H02G 3/0691; H02G 3/083; H01R 13/447; B60R 16/0215
USPC ...... 174/520, 50, 542, 72 A, 67.1, 53, 57–61, 174/67, 68.1, 480, 481, 489; 439/76.2, 439/76.1, 135, 136, 465, 470, 949; 429/65; 361/837, 600, 601, 38, 649, 679.01; 220/4.02
See application file for complete search history.

(56) References Cited

U.S. PATENT DOCUMENTS

| | | | |
|---|---|---|---|
| 5,939,675 A | 8/1999 | DeFreitas | |
| 6,837,745 B2 * | 1/2005 | Takada et al. | ................. 439/595 |
| 7,086,908 B2 * | 8/2006 | Fukuzaki et al. | ............ 439/669 |
| 7,360,800 B2 * | 4/2008 | Poll et al. | ...................... 285/242 |

(Continued)

FOREIGN PATENT DOCUMENTS

| | | |
|---|---|---|
| EP | 0720257 A2 | 7/1996 |
| EP | 0720257 A3 | 7/1996 |

(Continued)

OTHER PUBLICATIONS

Search Report (date of search: Aug. 24, 2012) from the United Kingdom Intellectual Property Office for the corresponding United Kingdom patent application No. GB1207303.7.

*Primary Examiner* — Angel R Estrada
*Assistant Examiner* — Dimary Lopez Cruz
(74) *Attorney, Agent, or Firm* — Edwards Wildman Palmer LLP

(57) ABSTRACT

A box-shape corrugated tube protector includes a side wall including an opening with a guide part at each both sides of the opening; a bottom wall including an insertion depression adapted to receive and support a corrugated tube, in communication with the opening; and a cover adapted to close the opening including a slide part slidably engaging with the guide part, and also including a projecting ridge and a rib inside, wherein the projecting ridge has an end face along a circumference of the corrugated tube, the rib has a projecting end face formed curved or sloped, continuous from the projecting ridge in a sliding direction of the cover, and the end face of the projecting ridge and the projecting end face of the rib smoothly intersects to each other.

8 Claims, 4 Drawing Sheets

(56) References Cited

U.S. PATENT DOCUMENTS

| | | |
|---|---|---|
| 7,507,905 B2 * | 3/2009 | Kanamaru et al. ............ 174/50 |
| 7,586,038 B2 * | 9/2009 | Kanamaru et al. ............ 174/50 |
| 7,934,934 B2 | 5/2011 | Taniguchi et al. |
| 1,020,461 A1 | 8/2011 | Sathyanarayana et al. |
| 2008/0149385 A1 | 6/2008 | Kanamaru et al. |
| 2008/0293269 A1 | 11/2008 | Kurizono et al. |
| 2009/0061291 A1 * | 3/2009 | Ohashi et al. ............ 429/65 |

FOREIGN PATENT DOCUMENTS

| | | |
|---|---|---|
| JP | 08-140241 A | 5/1996 |
| JP | 2008-061392 A | 3/2008 |
| JP | 2009-213195 A | 9/2009 |

* cited by examiner

CORRUGATED TUBE PROTECTOR

CROSS REFERENCE TO RELATED APPLICATION

The priority application Japan Patent Application No. 2011-107829 upon which this patent application is based is hereby incorporated by reference.

TECHNICAL FIELD

This invention relates to a corrugated tube protection structure to protect a corrugated tube of a wire harness that is inserted into a side opening of an electric junction box utilized for, e.g., an automobile, and is protected by covering with a slide side cover.

BACKGROUND ART

Conventionally, in order to hold synthetic resin corrugated tube for receiving and protecting a wire harness on a side wall of, for example, an electric junction box, various corrugated tube protectors have been advocated.

For example, PTL 1 indicates a recess arc-shaped in a cross-sectional larger than semicircle for receiving a wire harness is disposed on a side wall of a electric junction box (but not shown), further indicates, as conventional art, a corrugate tube is passed through a cut part of a lower cover to close the cut part, and a arc-shaped projection inside the cover is engaged with an annular recess of the corrugated tube.

Further, PTL 2 indicates a cover is disposed in a box main body that is a middle of the electric junction box via a hinge (but not shown), a corrugated tube is inserted into a cur part of a lower cover to close the cut part, and a arc-shaped projection inside the cover is engaged with an annular recess of the corrugated tube.

Further, PTL 3 indicates a U-shaped depression smaller than a corrugated tube and flange continuous therefrom are disposed inside an opening of an under cover of an electric junction box (but not shown), a cover is disposed in the opening via the hinge, and press part for pressing the corrugated tube disposed in the cover.

Other than those aforementioned, a structure of a conventional corrugated protector as shown in FIG. 8 is designed to include an U-shaped corrugated tube insertion depression 52 disposed in an electric junction box main body 51, and an openable cover 52 disposed on one side of the opening 52a via a hinge, where a projection 54 for locking a corrugated tube is disposed inside the corrugated tube insertion depression 52 to project, the rib 54 is made to engage with a slit 55a in a circumferential direction of the corrugated tube 55, and the cover 53 is closed so that the corrugated tube is locked at a side of the corrugated tube insertion depression 52 by an ungual locking means 56.

The corrugated tube 55 is a bellows harness protection tube, where concave valleys 55a and convex peaks 55b are arranged alternate to each other in a longitudinal direction of the tube, and a plurality of insulating coating electric wires is inserted therein.

CITATION LIST

Patent Literature

[PTL 1]
Japanese Patent Application Laid-Open Publication No. 2009-213, 195 (FIGS. 3, 7, and 8)

Japanese Patent Application Laid-Open Publication No. 2008-61, 392 (FIG. 4)
Japanese Patent Application Laid-Open Publication No. 8-140, 241 (FIG. 1)

SUMMARY OF INVENTION

Technical Problem

Disadvantageously, the aforementioned conventional corrugated tube protection structure as shown in FIG. 8 suffers from: poor condition for workability for installing, i.e., inserting the corrugated tube because of the corrugated tube 55 being dropped out from the corrugated tube insertion depression 52; likely unexpected opening of the cover 53 by repelling force of the corrugated tube 55 due to direction of separation of the corrugated tube 55 (i.e., the radial direction) and an opening of the cover 53 (i.e., the direction of arrow B) being the same; and likely infiltrating of such splashing water into the cover 53, i.e., the junction box 51 resulting from splashing water moving upward along the corrugated tube 55 because of a large gap 52a between the corrugated tube 55 and the cover 53 induced.

Further, when employing, e.g., a slide structure but not a hinge structure as a structure for opening and closing the cover 53, e.g., specifically, the cover cannot likely be closed because of a not-shown projection inside the cover getting stuck on edges of the convex peaks 55b in a circumferential direction of the corrugated tube 55.

An object of the present invention is, in view of the above, to provide a corrugated tube protection structure that makes, i.e., a slide cover in the electric junction box smoothly closed without getting stuck in a corrugated tube, prevents water from infiltrating from between the corrugated tube and the cover, and prevents the corrugated tube from unexpectedly disengaging from an insertion depression.

Solution to Problem

To attain the object, the corrugated tube protection structure according to a first aspect of the present invention comprises: an opening disposed in the side wall, and including a guide part at each of both sides of the opening; an insertion depression for receiving and supporting a corrugated tube, in communication with the opening, and disposed at the bottom wall; a cover for covering the opening including a slide part slidably engaging with the guide part; and a projecting ridge and a rib provided on an inner circumferential face of the cover, the projecting ridge having an end face along an outer circumferential face of the corrugated tube, and the rib continuous from the projecting ridge in a sliding direction of the cover, having a projecting end face formed arc-shaped or sloped, wherein the end face of the projecting ridge and the projecting end face of the rib smoothly intersect to each other.

By employing the structure mentioned above, the corrugated tube is inserted into the insertion depression and supported, a slider of the cover is, in this state, slidably engaged along the guide part, the projecting end face of the curved or sloped rib, on this occasion, smoothly contacts each of the peaks in the circumferential direction of the corrugated tube, thereby prevents interference between the peak and the projecting ridges so as to smoothly slide the cover. The rib is continuous therefrom in an opening or closing direction of the cover. The projecting ridge serves as eliminating a gap between the corrugated tube and inside of the cover, or pressing the corrugated tube against the insertion depression.

Because a radial direction of the insertion depression, i.e., a direction of disengagement of the corrugated tube, and a sliding direction of the cover, i.e., a longitudinal direction of the corrugated tube are normal to each other, repelling force of the corrugated tube prevents unexpectedly disengagement of the cover. The corrugated tube is supported or fixed in the insertion depression in a radial direction thereof by projections inside the insertion depression or press-fitting of the tube into the insertion depression and the like. A plurality of electric wires is preliminarily inserted into the corrugated tube.

The corrugated tube protection structure according to a second aspect provides the corrugated tube protection structure, where the end face of the projecting ridge is arc-shaped so that both sides of the projecting ridge in a circumferential direction is further projected in a radial direction of the corrugated direction than a middle part of the projecting ridge.

By employing the structure mentioned above, the both ends of the projecting ridges in a circumferential direction are inserted into, and engaged with, a gap at both ends of the corrugated tube in a radial direction that is cross-sectional circular to infill, contributing to prevention of infiltrating of water (e.g., such splashing water) along outside the corrugated tube, e.g., upwardly, into the cover or the box-shaped body.

The corrugated tube protection structure according to a third aspect provides the corrugated tube protection structure, where a pair of projecting ridges is collaterally arranged in a sliding direction of the cover, and the rib is arranged at each of the pair of projecting ridges.

By employing the structure mentioned above, the pair of the ribs sequentially or instantaneously abutting the corrugated tube in a longitudinal direction securely prevents interference between the projecting ridge and the peak of the corrugated tube, contributing to improvement for slidable attachment of the cover.

The corrugated tube protection structure according to a forth aspect provides the corrugated tube protection structure, where the insertion depression includes an inner circumferential face formed at an angle of more than 180-degree in its circumferential direction, the opening continuous from the inner circumferential face is formed smaller than inner diameter of the inner circumferential face.

By employing the structure mentioned above, the corrugated tube being pressed into the insertion depression in its radial direction secures itself without disengaging from the front opening of the insertion depression in its radial direction. Accordingly, it is not need to press the corrugated tube by hand when attaching the cover, contributing to improvement of workability for assembling.

Advantageous Effects of Invention

According to the invention of the first aspect, it is made possible to prevent interference of the peaks of the corrugated tube and the projecting ridge of the cover by the rib when slidably attaching the cover to the opening of the box-shaped body, and smoothly to open and close the slide cover of such the electric junction box without getting stuck in the corrugated tube. This makes it possible to eliminate such destructive deformation of the corrugated tube or disengagement from the insertion depression by getting stuck, and to improve workability for detachment of the cover.

According to the invention of the second aspect, infilling the gap at both ends of the corrugated tube in the radial direction with the both ends of the projecting ridge in the circumferential direction makes it possible to prevent water from infiltrating along outside the corrugated tube into the box-shaped body.

According to the invention of the third aspect, abutting the pair of ribs in a longitudinal direction of the corrugated tube onto the corrugated tube in an instantaneous and stable manner makes it possible securely to prevent interference between the projecting ridge of the cover and the peak of the corrugated tube, and improve workability for slidable attachment of the cover.

According to the invention of the forth aspect, it is made possible to prevent unexpectedly disengagement of the corrugated tube from the insertion depression, and thereby improve workability for assembling of the corrugated tube and the cover into the box-shaped body.

BRIEF DESCRIPTION OF DRAWINGS

For a fuller understanding of the nature and desired objects of the present invention, reference is made to the following detailed description taken in conjunction with the accompanying drawing figures wherein like reference characters denote corresponding parts throughout the several views and wherein.

DESCRIPTION OF EMBODIMENTS

FIGS. 1 to 7 illustrate a first exemplary embodiment of a structure of a corrugated tube protector according to the present invention.

Figure 1:
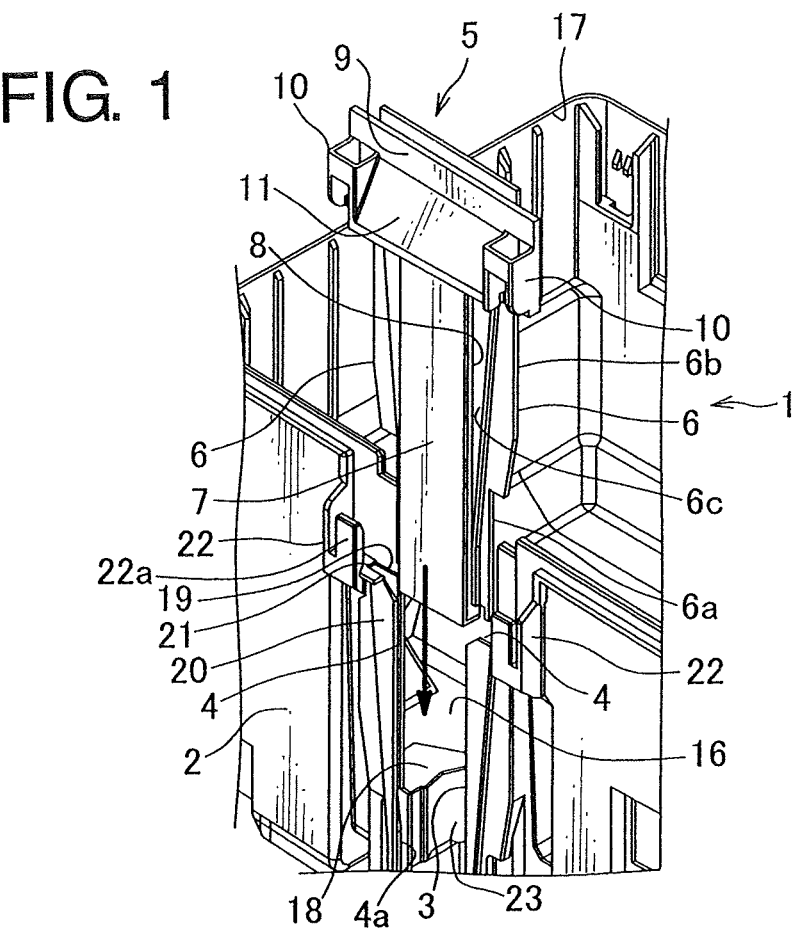
FIG. 1 is an exploded perspective view illustrating one embodiment of a corrugated tube protector according to the present invention.

As shown in FIG. 1, the corrugated tube protector is provided with a vertical rectangular slit-like opening 3 on a vertical side wall 2 of a synthetic resin junction main body (that is, box-shaped body), a pair of guide grooves (or guide parts) 4 at outer edges of horizontal both sides of the opening 3, and slide plates (or slide parts) 6 at horizontal both sides of a side cover (or cover) 5 that is made of synthetic resin and is nearly plate-like, the slide plates 6 being slidably downwardly engaged with the guide grooves 4 to cover the opening 3 with the side cover 5.

The side cover 5 is provided with: a vertical plate wall 7 located at middle widthwise; a vertical narrow-width side wall 8 shown in FIG. 2 at right and left sides, normal to the plate wall 7, projecting on back face of the plate wall 7; slide plates 6 projecting in a flange shape from middle in a thickness direction of each of the side walls 8 toward a width direction of the plate wall 7 (in a direction from side to side); lock parts 10 disposed at horizontal both sides of an outside (its surface or front face) of a broad plate 9 upper the plate wall 7; and a downward sloped wall 11 for operation, projecting from outside of narrow-width plate 9 between both lock parts 10. A lower side 6a of the slide plate 6 is made narrow, an upper side 6b broad. The lock part 10 is provided with, e.g., a not-shown flexible locking hook in a frame-like protecting wall.

Figure 2A:
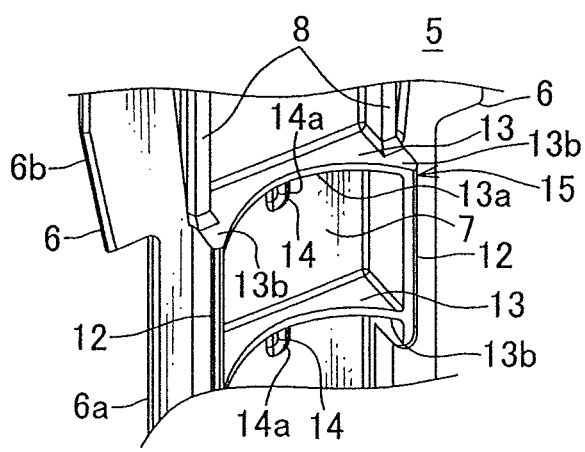
FIG. 2A is an upward perspective view illustrating inside one embodiment of a side cover in the corrugated tube protector.
Figure 2B:
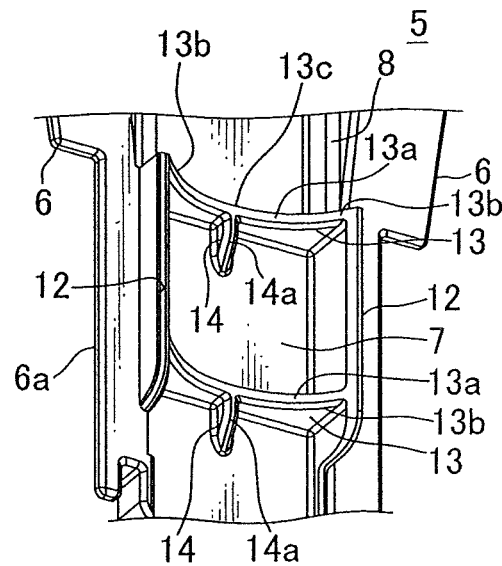
FIG. 2B is a downward perspective view illustrating inside one embodiment of the side cover in the corrugated tube protector.

As shown in FIG. 2A, 2B, a projecting wall 12 vertical to the horizontal side walls 8 is integrally extended inside down the side cover 5 (back face or rear face), a pair of horizontal arc-shaped projecting ridges 13 is vertically disposed between the pair of projecting walls 12, inside the projecting wall 12 to the plate wall 7, and a vertical short sloped rib 14 is disposed from bottom face of the projecting ridge 13 to inside of the plate wall 7 in a middle part 13c of the projecting ridge 13.

An inside of the projecting wall 12 is formed deeper (or wider) than an outside thereof with reference to the slide plate 6, normal to inside of the plate wall 7, as well as to inside of the slide plate 6. Both the side walls 8 and the plate wall 7 define a cross-sectional bracket space, and both the projecting walls 12 and the plate wall 7 define a deeper cross-sectional bracket space than that defined by both the side walls 8 and the plate wall 7. The sloped rib 14 is disposed between both the projecting walls 12 in the bracket space.

The arc-shaped projecting ridge 13 is formed bilaterally symmetrical so as to become narrower and shallower at the middle part 13c, and broader and deeper at both sides 13b, whereby the both sides 13b further project rearward than the middle part 13c, the both sides 13b include a arc-shaped face 13a at a projecting end (rear end). The upper projecting ridge 13 and an upper end of the projecting wall 12 are positioned in the same horizontal plane, the lower projecting ridge 13 is positioned upper than a lower end of the projecting wall 12, the right and left walls 12 and the up and down projecting ridges 13 compose a rectangular frame-like wall 15, and a lower end of the lower rib 14 and an lower end of the projecting wall 12 are located on nearly the same horizontal line.

An upper end of the rib 14 and the projecting end face (arc face) of the projecting ridge 13 are positioned in the same vertical plane, and each of the ribs 14 is formed sloped or curved so as to lower its height gradually and downwardly, to intercross inside of the plate wall 7 at its lower end. Each of the ribs 14 is formed nearly as thick as that of projecting wall 12 or the projecting ridge 13. The upper projecting ridge 13 and a lower end of the broad part 6a of the slide plate 6 are positioned in nearly the same horizontal plane. The lower projecting ridge 13 and its lower rib 14 are positioned upper than a lower end of the plate wall 7.

A projecting end face 14a of the rib 14 is arranged sloped or curved, an upper end of which is made smoothly continuous to the middle of the projecting end face 13a of the projecting ridge 13 without any steps. The upper end of the rib 14 is arranged normal to bottom face of the projecting ridge 13, and the rib 14 is arranged normal to inside of the plate wall 7.

As shown in FIG. 1, the junction box main body 1 is provided with vertical side walls (circumferential walls) 2 on all sides, a horizontal bottom wall 16, and an upper opening 17, whereby on the bottom wall 16 a thicker wall 18 is formed near at left side of the opening 3 of the side wall 2. The guide groove 4 of both side edges of the opening 3 is made surrounded by a vertical inside wall 19, a vertical outside wall 20, and a side wall 21 connecting both the walls 19, 20, and formed into cross-sectional opening bracket or closing bracket shape. A locked part 22 is disposed up the side wall 2 in upper the guide grooves 4, and composed of, e.g., a vertical upward protruding part 22a inside a left or right side protection wall, and a not-shown boss formed inside the protruding part 22a.

Figure 3:
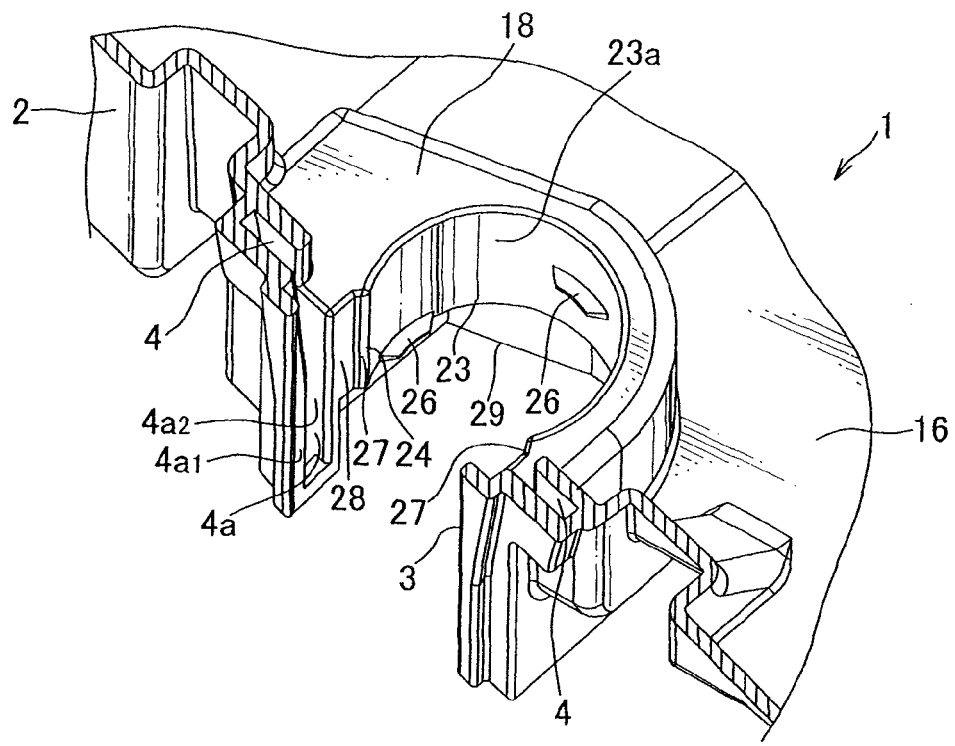
FIG. 3 is a perspective view illustrating cross-section of a main part of one embodiment of a junction box main body in the corrugate tube protector.

As FIG. 3 shows a bottom wall of the junction box main body 1, inside the opening 3 in the side wall 2 of the junction box main body 1, a cross-sectional arc-shaped corrugated tube insertion depression 23 is vertically disposed in the thick wall 18 in the horizontal bottom wall 16, which has an inner circumferential face 23 formed at an angle of larger than 180-degree. A front opening 24 of the insertion depression 23 communicates with rear side of the opening 3 of the side wall 2, and an arc-shaped projection 26 is arranged vertically displaced, which enters into, and is engaged with, circumferential valleys of the cross-sectional circular corrugated tube 25 (see FIG. 4), e.g., in three directions such as right, left and rear of the circumferential face 23 of the insertion depression 23.

More specifically, the circumferential face 23 of the insertion depression 23 is formed at an angle of about 250-degree (in this case, the front opening 24 is virtually formed at an angle of the order of 110-degree in a circumferential direction), and width of the front opening 23 (that is, width from side to side) is arranged smaller than inner diameter of the insertion depression 23. A length of the insertion depression 23 in an axial direction (that is, depth) is arranged slightly smaller than its inner diameter. The front opening 24 is made continuous to vertical inner walls 28 opposite to each other form side to side through step faces 27 slightly sloped outward, and a lower part 4a of the vertical guide groove 4 vertical to both the inner walls 28 is formed.

The lower part 4a of the guide groove 4 is formed in a two-stage shape in front and rear direction (to symbolize a front guide groove narrower from side to side as $4_{a1}$, a rear guide groove broader from side to side as $4_{a2}$), and as shown in FIG. 1, continues upward as being broadened.

The slide plate 6 shown in FIG. 1 is composed of a front tapered inner part 6c, and a rear outer part 6b continuous widthwise from the inner part 6c through a step, and the guide groove 4 is formed in two-stage shape in front and rear direction so as to fit the slide plate 6. Down the insertion depression 23 in FIG. 3, right, left, and rear side walls 29 integral with the thick bottom wall 18 are formed to have larger diameter than that of the insertion depression 23 (refer to FIG. 6).

Figure 4:
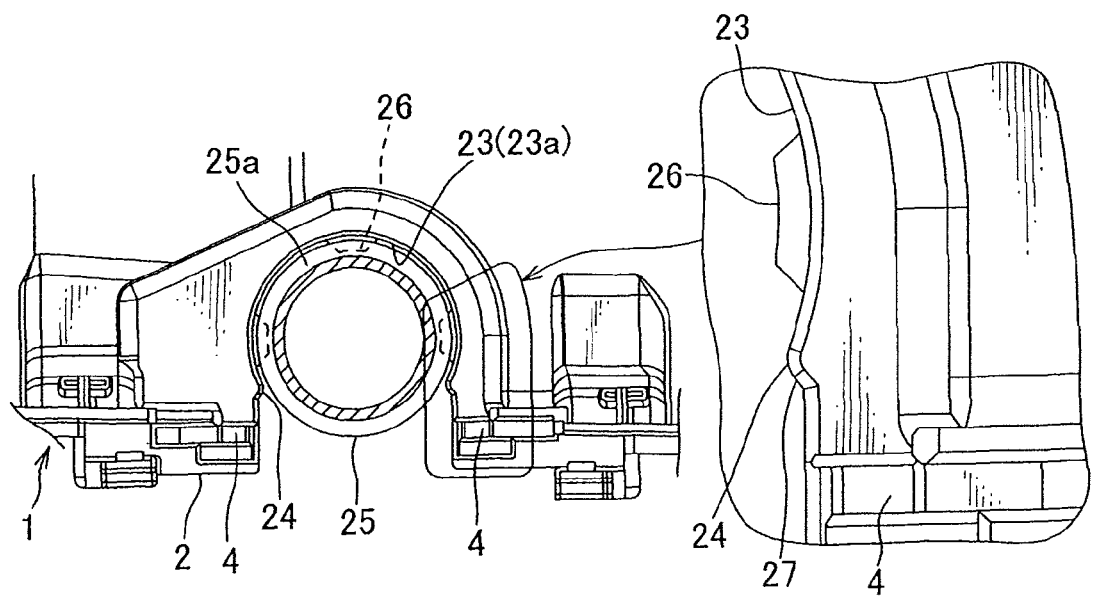
FIG. 4 is a plane view illustrating a state before installing the side cover in the corrugate tube protector.

As shown in FIG. 4, the corrugated tube 25 is inserted into, and engaged with, the insertion depression 23 of the junction box main body 1. The corrugated tube 25 is pressed in a radial direction into the insertion depression 23 from the front opening 24. The corrugated tube 25 is so flexible that it can be shrunk in the radial direction, passed through the front opening 24 narrower than the insertion depression 23, and then restored, ant that is can contact inner circumferential face 23a of the insertion depression 23. Preliminarily, not-shown a plurality of electric wires (wire harnesses) are inserted into the corrugated tube 25.

As shown in the enlarged view of FIG. 4, a front opening end 24 of the insertion depression 23 projects inward to make the opening 24 narrower than inner diameter of the insertion depression 23, and to form the insertion depression 23 into nearly C-shape in cross-section, thus preventing the corrugated tube 25 from disengaging from the insertion depression 23 without closing the side cover 5 (see FIG. 1). Therefore, it is unnecessary to manually press the corrugated tube 25 until the side cover closed not to disengage, improving of assembling workability.

Referring to FIG. 4, the projections 26 of the inner circumferential face 23a of the insertion depression 23 are engaged with grooves (valley) 25a, and thereby preventing the corrugated tube 25 from disengaging from the insertion depression 23 in a radial direction of the corrugated tube 25. Pitch of the projections 26 in FIG. 3 is arranged nth-pitch of that of the groves 25a, where n=1, 2 . . . .

Figure 5:
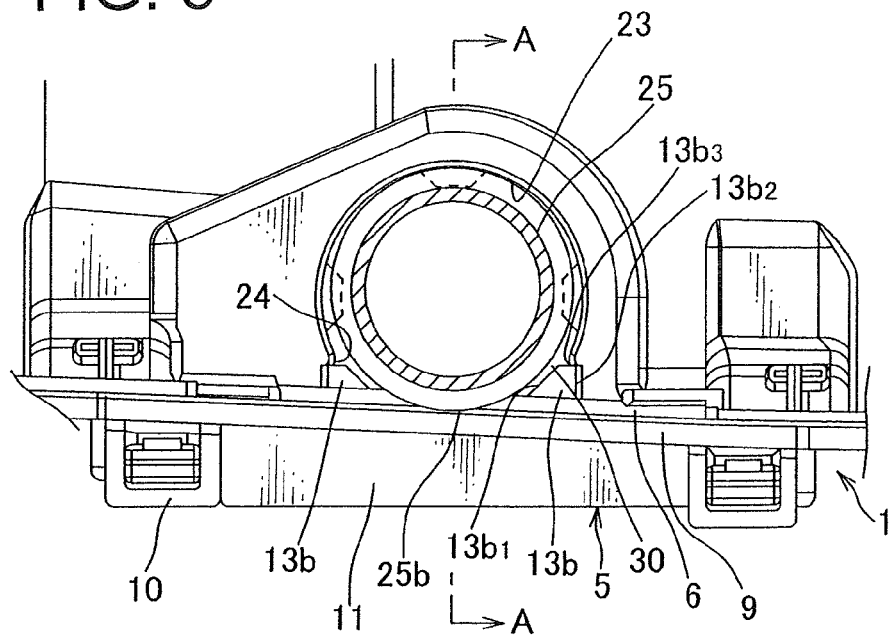
FIG. 5 is a plane view illustrating a state after installing the side cover in the corrugate tube protector.

As shown by the arrow in FIG. 1, closing the side cover 5 slidably downward makes a projecting part 13b of both sides of vertical projecting ridges 13 inside the side cover 5 infill a gap between outside face of the ridges (peaks) 25b of the corrugated tube 25 and the side cover 5 (in FIG. 5, the gap 30 is shown widened for convenience of its description). Water can thereby be prevented from infiltrating into the side cover 5, i.e., the junction box main body 1 upwardly along the corrugated tube 25.

As shown in FIG. 5, a projecting part 13b from side to side of the projecting ridge 13 is provided with an arc-shaped or sloped inside face $13b_1$, vertical side face $13b_2$, and a projection end face $13b_3$ that is intersection of the inside face $13b_1$ and the side face $13b_2$, whereby the arc-shaped inside face $13b_1$ abuts onto, or comes close to, outside of the circumferential ridges (or peaks) 25b of the corrugated tube 25, the vertical side face $13b_2$ abuts onto, or comes close to, front side inner wall face 28 (in FIG. 3) continuous to front side of the front opening 24 (in FIG. 3) of the insertion depression 23 in the junction box main body 1, and the projection end face 13b3 abuts onto, or comes close to, an adjacent step 27 of the front opening 24.

Water that streams upward along the corrugated tube 25 hits on bottom face of the lower arc-shaped projecting ridge 13 shown in downside of the FIG. 2B, to drop down. Water that has passed through the lower projecting ridge 13 hits on a bottom face of the upper arc-shaped projecting ridge 13, which prevents further infiltrating. For example, when the electric junction box 31 (see FIG. 7) is installed in the engine room of the vehicle, splashing water during travel or high pressure washing water that likely streams upward along the corrugated tube 25, is prevented from infiltrating by the arc-shaped projecting ridge 13.

In FIG. 5, reference sign 11 denotes an operating part up the side cover 5, reference sigh 10 lock part of its both sides, reference sign 9 upper broad plate, reference sign 6 upper the slide plate (in detail refer to FIG. 1).

Figure 6:
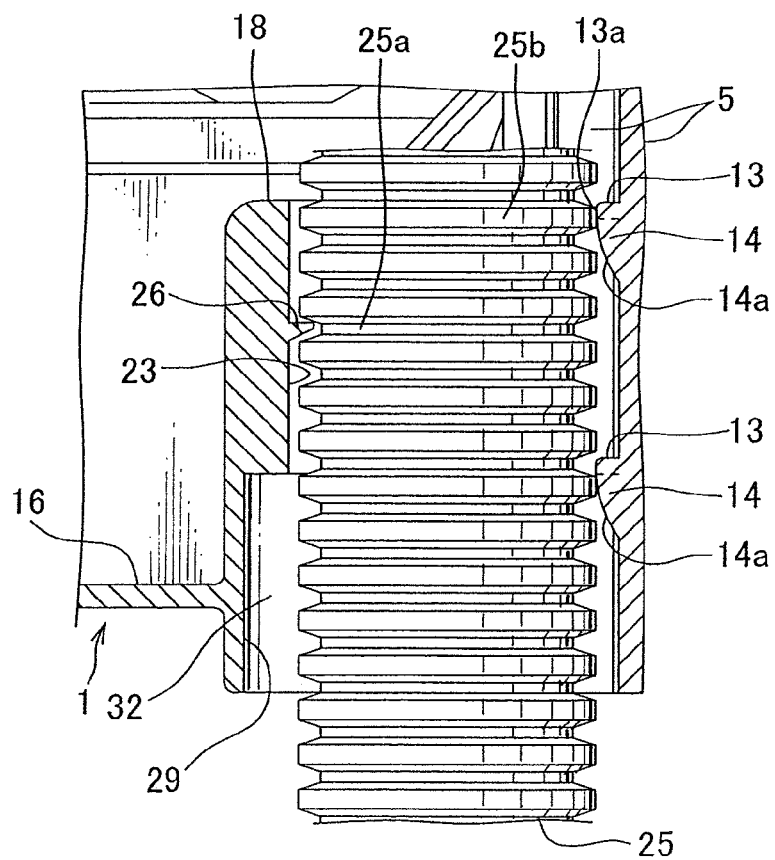
FIG. 6 is a cross-sectional view taken along A-A in FIG. 5.

As shown in FIG. 6, (or cross-section taken along A-A line in FIG. 5), while the side cover 5 closed, the end face 13a of the projecting ridge 13 on the side over 5 abuts onto outer face of the projecting peak 25b of the corrugated tube 25 along with an upper end face of the rib 14 continuous to down the projecting ridge 13.

When the slide plate 6 is slidably engaged with the guide groove 4 downward as shown by the arrow in FIG. 1, an arc-shaped face or sloped face 14a from lower end to upper end of the rib 14 smoothly abuts onto upper end (edge part) of the projection strip 25b of the corrugated tube 25, and thereby the side cover 5 can be smoothly closed and stopped. This improves workability for attachment of the cover to the junction box main body 1. When no rib 14 is provided, lower end of the projecting end face 13a of the projecting ridge 13 hits upper end of the peak 25b of the corrugated tube 25 (or lower end of the valley 25a), causing poor workability for slide attachment of the side cover 5.

Since the ribs 14 are arranged at every upper and lower projecting ridges 13, when sliding downward the side cover 5, the lower rib 14 first abuts onto the peak 25b of the corrugated tube 25 to smoothly pass the lower projecting ridge 13 along outside the peak 25b of the corrugated tube 25, and subsequently likewise, the lower rib 14 smoothly abuts onto each of the lower peaks 25b, and smoothly leads the lower projecting ridge 13. At the same time, the upper rib 14 likewise smoothly abuts onto each of the peaks 25b, to lead the upper projecting ridge 13 without getting stuck along the peak 25b. The pair of upper and lower ribs 14 makes the slide cover 5 smoothly slide into the guide groove 4 without suffering from widthwise swing force.

As shown in FIG. 6, while the side cover 5 being attached, the pair of upper and lower ribs 14 and each of the projecting ridges 13 continuous from the ribs 14 are positioned at upper end and lower end of the insertion depression 23 of the thick bottom wall 18 in the junction box main body 1. The projection 26 inside the insertion depression 23 engages valley 25a of the corrugated tube 25. Nearly bracket-like space 32 surrounded by the extending walls 29 at down the insertion depression 23 is positioned about the corrugated tube 5.

Figure 7:
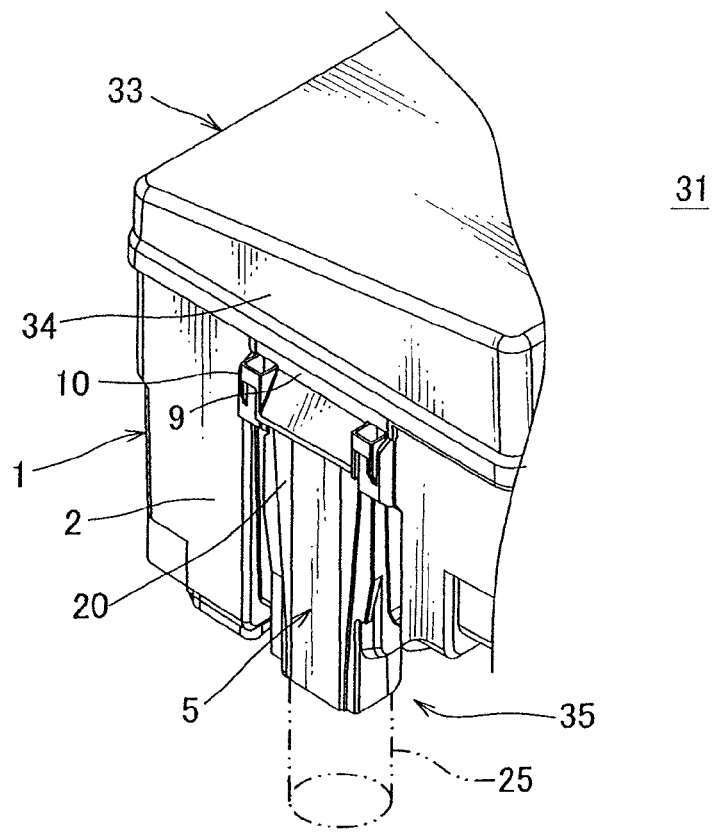
FIG. 7 is a perspective view illustrating main part of one embodiment of the electric junction box including the corrugated tube protector.
Figure 8:
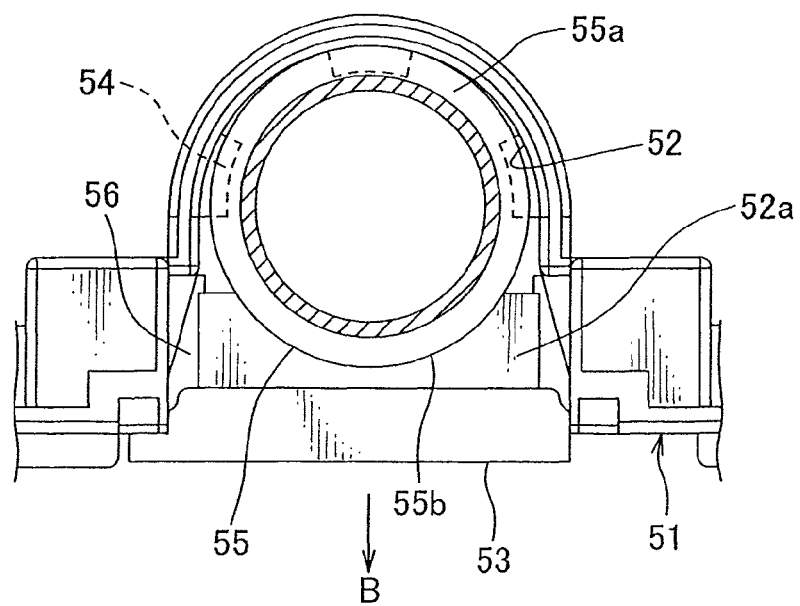
FIG. 8 is a plane view illustrating one embodiment of a conventional corrugated tube protector.

As shown in FIG. 7, the broad plate 9 of upper end of the side cover 5 closely abuts onto inside of the side wall 34 of the synthetic resin upper cover 33 (that is, upper end of the side cover 5 is covered with the upper cover 33 without any gap), preventing such water from infiltrating up the side cover 5. The junction box main body 1 is provided with a right, left, front and rear side wall 2, and bottom wall 16, whereby not-shown connection block and the like that is mounted with electric components such as fuse or relay, or connector are accommodated in an inner space surrounded by the side wall 2 and bottom wall 16.

For example, the plurality of electric wires that has pulled out upward from a mating connector engaged with the connector of the junction block, while covered by the corrugated tube 25, is passed the inner space of the upper cover 33, through inside the side cover 5, and is pulled out downward from the insertion depression 23 of the junction box main body 1 to outside. For example, the plurality of electric wires that has been connected to electric components of the junction block is pulled out from a not-shown guide bore down the junction box main body 1 to outside. At least junction box main body 1 (a main cover or case), junction block, upper cover 33, and the side cover 5 compose the electric junction box 31.

It should be noted that in the aforementioned embodiment, the rib 14 of the side cover 5 is positioned down the projecting ridge 13, and thereby preventing getting stuck in the corrugated tube when closing the side cover 5. Alternatively, for example, placing the ribs 14 at up and down the projecting ridge 13 symmetrically forms nearly an isosceles triangle mound with up and down ribs 14, which may prevent getting stuck in the corrugated tube 25 upon the side cover 5 being closed and opened.

Further, in the aforementioned embodiment, the structure of the corrugated tube protector 35 is adapted to the electric junction box 31. Alternatively, for example, the structure of the corrugated tube protector 35 may be adapted to structures other than the electric junction box 31, where such not-shown synthetic resin harness protector is provided with a broad slit-like opening (3), a corrugated tube insertion depression (23) is provided inside the opening (3), a side cover (cover) (5) is slidably attached to the opening (3). The junction box main body 1 or the harness protector or the like is generically named a box-like body.

Further, in the aforementioned embodiment, the projecting ridge 13 having the arc-shaped projecting end face 13a is provided with the rib 14 continuously. Alternatively, a plate-like projecting ridge (13) having a straight projecting end face (13a) instead of arc-shaped one may be provided with the rib 14, also working to prevent interference between the projecting ridge (13) and the corrugated tube 25. In this case, the rib 14 is placed where the projecting ridge (13) and the corrugated tube 25 abut onto, or interfere to, each other, i.e., vertical provisional line is traced from a center of the corrugated tube 25 to the end face (13a) of the projecting ridge (13).

Further, in FIG. 2 of the aforementioned embodiment, the rib 14 may be disposed, at middle of the projecting ridge 13 in the arc-shaped end face 13a and both ends, or only at both ends instead. Further, by eliminating the projection 26 in FIG. 3 of the aforementioned embodiment, stiffness in a radial direction can be improved, and also the corrugated tube with larger diameter than the insertion depression 23 may be press-fitted and held. Further, as the projection 26, that formed longer in a circumferential direction, or formed projecting shortly may be used.

Further, in the aforementioned embodiment, the cross-sectional arc-shaped insertion depression 23 or projecting ridge 13 are formed to correspond to the cross-sectional circular corrugated tube 25. The insertion depression 23 or projecting ridge 13, when employing cross-sectional ellipsoidal corrugated tube, may alternatively be made arc-shaped (curved) so as to correspond to their outside shape.

Further, in the aforementioned embodiment, as shown in FIG. 2, the lower and upper projecting ridges 13, and the right and left projecting walls 12 compose the rectangular frame-like wall 15. Alternatively, eliminating the projecting wall 12, only the upper and the lower projecting ridges 13, and the ribs 14 may compose the wall 15. Further, in the aforementioned embodiment, the junction box main body 1 is provided with the guide groove (guide part) 4, and the side cover 5 the side plate (slide part) 6. Alternatively, the side cover 5 may be provided with the guide groove (slide part) 6, the junction box main body the slide plate (guide part) 6.

INDUSTRIAL APPLICABILITY

The structure of the corrugated tube protector according to the present invention can be utilized for, smoothly closing the slide cover without getting stuck in the electric junction box mounted in, for example, the vehicle, in addition for prevention of infiltration of water from between the corrugated tube and the cover, or unexpectedly disengagement of the corrugated tube from the insertion depression of the electric junction box main body, and unexpectedly opening of the cover.

REFERENCE SIGNS LIST 1 junction box main body
2 side wall
3 opening
4 guide groove (guide part)
5 side cover (cover)
6 slide plate (slide part)
13 projecting ridge
13a end face
13b both sides
13c middle part
14 rib
14a projecting end face
16 bottom face
23 insertion depression
23a inner circumferential face
24 front opening
25 corrugated tube

The invention claimed is:

1. A box-shaped corrugated tube protector including a side wall and a bottom wall comprising:
    an opening disposed in the side wall, and including a guide part at each of both sides of the opening;
    an insertion depression for receiving and supporting a corrugated tube, in communication with the opening, and disposed at the bottom wall;
    a planar cover for covering the opening including a slide part slidably engaging with the guide part; and
    a projecting ridge and a rib provided on an inner circumferential face of the cover, the projecting ridge having an arc-shaped end face along an outer circumferential face of the corrugated tube, and the rib continuous from the projecting ridge in a sliding direction of the cover, having a projecting end face formed arc-shaped or sloped, wherein the end face of the projecting ridge and the projecting end face of the rib smoothly intersect to each other.

2. The corrugated tube protector as claimed in claim 1, wherein the end face of the projecting ridge is arc-shaped so that both sides of the projecting ridge in a circumferential direction is further projected in a radial direction of the corrugated direction than a middle part of the projecting ridge.

3. The corrugated tube protector as claimed in claim 1, wherein the insertion depression includes an inner circumferential face formed at an angle of more than 180-degree in its circumferential direction, the opening continuous from the inner circumferential face is formed smaller than inner diameter of the inner circumferential face.

4. The corrugated tube protector as claimed in claim 2, wherein
    the insertion depression includes an inner circumferential face formed at an angle of more than 180-degree in its circumferential direction, the opening continuous from the inner circumferential face is formed smaller than inner diameter of the inner circumferential face.

5. The corrugated tube protector as claimed in claim 1, wherein a pair of projecting ridges is collaterally arranged in a sliding direction of the cover, and the rib is arranged at each of the pair of projecting ridges.

6. The corrugated tube protector as claimed in claim 5, wherein the insertion depression includes an inner circumferential face formed at an angle of more than 180-degree in its circumferential direction, the opening continuous from the inner circumferential face is formed smaller than inner diameter of the inner circumferential face.

7. The corrugated tube protector as claimed in claim 2, wherein a pair of projecting ridges is collaterally arranged in a sliding direction of the cover, and the rib is arranged at each of the pair of projecting ridges.

8. The corrugated tube protector as claimed in claim 7, wherein the insertion depression includes an inner circumferential face formed at an angle of more than 180-degree in its circumferential direction, the opening continuous from the inner circumferential face is formed smaller than inner diameter of the inner circumferential face.

* * * * *